United States Patent
Rajamani et al.

(10) Patent No.: US 7,912,835 B2
(45) Date of Patent: Mar. 22, 2011

(54) COMPILE TIME OPCODES FOR EFFICIENT RUNTIME INTERPRETATION OF VARIABLES FOR DATABASE QUERIES AND DML STATEMENTS

(75) Inventors: Kumar Rajamani, Santa Clara, CA (US); Namit Jain, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 11/104,993

(22) Filed: Apr. 12, 2005

(65) Prior Publication Data

US 2005/0256854 A1     Nov. 17, 2005

Related U.S. Application Data

(60) Provisional application No. 60/571,333, filed on May 14, 2004.

(51) Int. Cl.
*G06F 17/30*     (2006.01)
(52) U.S. Cl. .................. 707/718; 707/713; 717/140
(58) Field of Classification Search .......... 707/718, 707/713; 717/140
See application file for complete search history.

(56) References Cited

U.S. PATENT DOCUMENTS

| | | | | |
|---|---|---|---|---|
| 5,802,523 A * | 9/1998 | Jasuja et al. | ............... | 707/103 R |
| 5,913,029 A * | 6/1999 | Shostak | ............... | 709/203 |
| 5,937,415 A * | 8/1999 | Sheffield et al. | ............... | 707/204 |
| 6,532,448 B1 * | 3/2003 | Higginson et al. | ............... | 705/14 |
| 7,039,699 B1 * | 5/2006 | Narin et al. | ............... | 709/224 |
| 7,051,034 B1 * | 5/2006 | Ghosh et al. | ............... | 707/100 |
| 7,203,672 B2 * | 4/2007 | Cruanes et al. | ............... | 707/2 |
| 2002/0023091 A1 * | 2/2002 | Silberberg et al. | ......... | 707/103 Y |
| 2002/0120940 A1 * | 8/2002 | Willard | ............... | 707/513 |
| 2003/0055813 A1 * | 3/2003 | Chaudhuri et al. | ............... | 707/3 |
| 2004/0006745 A1 * | 1/2004 | van Helden et al. | ............... | 715/516 |
| 2004/0196839 A1 * | 10/2004 | Sahita | ............... | 370/389 |
| 2005/0154550 A1 * | 7/2005 | Singh et al. | ............... | 702/108 |
| 2005/0187907 A1 * | 8/2005 | Wortendyke et al. | ............... | 707/3 |

FOREIGN PATENT DOCUMENTS

WO    WO2005/022409 A2 * 3/2005

OTHER PUBLICATIONS

Fuh et al., "Supporting Procedural Constructs in Existing SQL Compilers", Nov. 1996, Proceedings of the 1996 Conference of the Centre for Advanced Studies on Collaborative Research CASON '96, IBM Press, p. 1-13.*

Kiernan et al., "Extending SQL-92 for OODB Access: Design and Implementation Experience", Oct. 1995, ACM SIGPLAN Notices, Proceedings of the Tenth Annual Conference on Object-oriented programming systems, languages, and applications (OOPSLA '95), vol. 30, Issue 10, p. 467-480.*

(Continued)

*Primary Examiner* — Khanh B Pham
(74) *Attorney, Agent, or Firm* — Vista IP Law Group, LLP.

(57) ABSTRACT

A method system and program for performing a query in which context and information including opcodes accompanies an execution plan for the query. The opcodes determine operations to retrieve a set of bind variables. The execution plan and context information shared by a plurality of application programs.

30 Claims, 3 Drawing Sheets

OTHER PUBLICATIONS

Peacetech.com, "Oracle 9i Java Stored Procedures Developer's Guide Release 1(9.0.1) Part No. A90210-01", Dec. 2001, Oracle Corp., p. 1-15. Retrieved and reprinted Dec. 2007.*

Braganholo, V.P. et al. "From XML View Updates to Relational View Updates: Old Solutions to a New Problem" Proceedings of the International Conference on Very Large Databases (VLDB '04), Toronto, Ontario, Canada, 2004, pp. 276-287.

Engsig, B. "Efficient Use of Bind Variables, Cursor_Sharing and Related Cursor Parameters" Oracle White Paper, Miracle A/S Document #2, Sep. 10, 2002, 11 pgs.

Fikes, R. et al. "Designing a Query Language for the Semantic Web" The Knowledge Systems Library, Stanford University, 2002, 16 pgs.

Fikes, R. et al. "OWL-QL—A Language for Deductive Query Answering on the Semantic Web" Stanford University, 2003, pp. 1-11 in "Web Semantics: Science, Services and Agents on the World" 2004, Elsevier BV.

Ma, H. et al. "Fragmentation of XML Documents" Proceedings of the XVIII Simposo Brasileiro de Bancos de Dados, 2003, 15 pgs.

Oracle Corporation "Binding and Defining" located in "Oracle Call Interface™, Programmer's Guide, vols. 1 and 2, Release 8.0" Dec. 1997, pp. 5-1-5-28, Oracle Corporation, Redwood Shores, CA.

Oracle Corporation "OCI Relational Functions" located in "Oracle Call Interface™, Programmer's Guide, vols. 1 and 2, Release 8.0" Dec. 1997, pp. 13-1-13-164, Oracle Corporation, Redwood Shores, CA.

Oracle Corporation Using XML-SQL Utility (XSU) located in "Oracle 8i Application Developer's Guide—XML, Release 3 (8.1.7)" Sep. 2000, pp. 4-1-4-64, Oracle Corporation, Redwood Shores, CA.

Oracle Corporation "Implementing Application Security Policies" located in "Oracle 9i Application Developer's Guide—Fundamentals, Release 2 (9.2)" Mar. 2002, pp. 12-1-12-62, Oracle Corporation, Redwood Shores, CA.

Oracle Corporation "XSU for PL/SQL" located in "Oracle® XML Developer's Kit Programmer's Guide, 10g Release 1 (10.1)" Dec. 2003, pp. 24-1-24-16, Oracle Corporation, Redwood Shores, CA.

Bind Variable—Oracle FAQ; http://www.orafaq.com/wiki/Bind_variable, Jun. 2010.

Frameworks: Using Bind Variables; http://www.oracle.com/technology/oramag/oracle/06-mar/o26frame.html?, Apr. 2006.

Oracle Database Performance Tuning Guide 10g Release 1 (10.1); Glossary; http://download.oracle.com/docs/cd/B14117_01/server.101/b10752/glossary, Jun. 2010.

* cited by examiner

COMPILE TIME OPCODES FOR EFFICIENT RUNTIME INTERPRETATION OF VARIABLES FOR DATABASE QUERIES AND DML STATEMENTS

CROSS REFERENCE AND RELATED APPLICATION

This application claims benefit of U.S. Provisional Application Ser. No. 60/571,333 filed on May 14, 2004 entitled "Compile Time Opcodes for Efficient Runtime Interpretation of Variables for Database Queries and DML Statements." This application is hereby incorporated and is fully set forth herein.

BACKGROUND

A set of actions is generated at the compile time of a statement. The actions can be stored as opcodes, or processes to be performed at execution time of the statement. The opcodes are used by an execution engine to determine which processes to perform in order to retrieve values for the variables in the statement. After the values are retrieved, the statement is executed.

For example, most DML statements, and some queries (such as those with a WHERE clause), have a program to pass and receive data to the database server as part of a SQL or native language statements (PL/SQL). Such data can be constant or literal data, which is usually unknown when the program is compiled. This data is referred to as bind variables in a database server.

In a database application, most of the queries and DML statements usually contain multiple bind variables. The user input is read at runtime for input bind variables, and the output is sent back for output bind variables.

Reading and writing the bind data values for the bind variables (bind processing) can be very expensive because of the context under which the reading and writing are processed. A large part of the runtime for a query is due to re-determining metadata about this context, which was available but not captured, when the query was compiled. Bind processing can vary a lot depending on the metadata and user/language context. If this metadata is not captured at compile time, a lot of time needs to be spent at runtime to gather the relevant information in order to determine which actions to take when performing bind processing.

SUMMARY

An example method of performing a query includes: retrieving an execution plan and context information for the query, and retrieving bind values for bind variables of the query based on the context information. Another example method of performing a query includes: receiving a SQL statement having a plurality of bind variables at a compilation engine, compiling an execution plan for the SQL statement, determining information about a context of the SQL statement, and compiling a set of bind actions for the SQL statement which, when executed by an execution engine, causes the execution engine to gather bind values for the bind variables.

DETAILED DESCRIPTION

By gathering information at compile time, and storing it as interpretable opcodes in the shared query context, the decisions about which actions to perform during bind processing at runtime can be made significantly faster. Bind variables are processed based on the usage context. For e.g. bind values may be present in the network or server buffers depending on whether the query is issued by an external or an internal client. Prior to interpretable opcodes, the usage context information was not captured in the shared query context. At runtime, the usage context information is re-determined, thus causing significant performance overhead. To reduce the performance overhead, the usage context information for the bind variables is captured at compile time. This context information can be stored in the form of opcodes. This makes the runtime processing of the statement much faster, because the execution engine retrieves the bind values for the bind variables of the statement by performing operations associated with the captured context information. This is faster than conventional approaches of execution, which have to re-determine the context information during runtime to be able to retrieve the bind values.

An advantage of gathering usage context information at compile time and storing it as opcodes is much better performance, and more control over critical sections. By gathering information at compile time, and storing it as interpretable opcodes in the shared query context, decisions at runtime are made significantly faster: The opcodes can be used by any application for reducing the runtime for processing input/output variables by gathering more metadata information at compile time.

Figure 1:
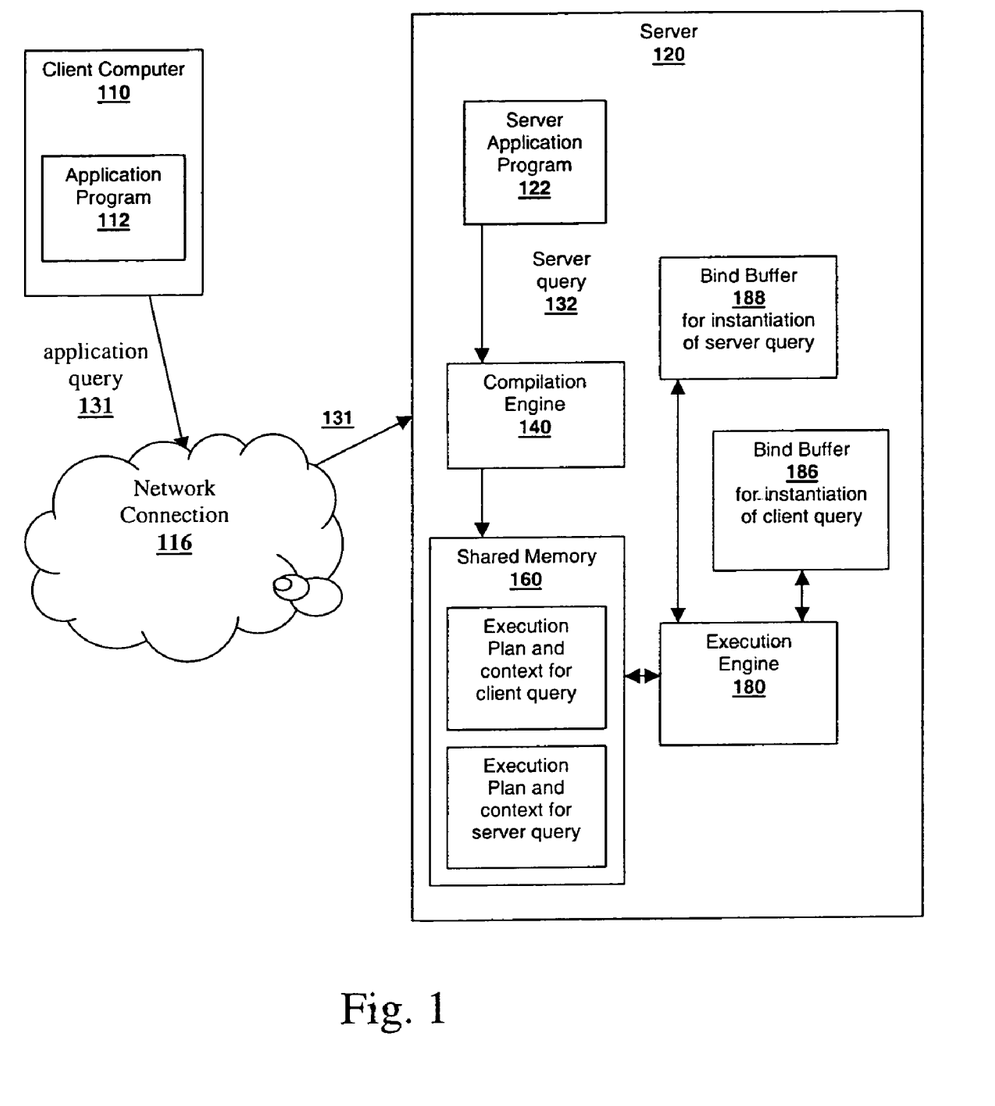
FIG. 1 shows an example of a compiled query plan with context information.

An example of a compiled query plan with context information is shown in FIG. 1. A client, such as an external application program 112 running on a computer 110, issues a query 131 over a network connection, such as the internet for example. For example, the application program can issue a SQL statement 130 to retrieve data from a database. The query may also be issued by an internal application program 122 running on the server itself 120: The statement is compiled by a compilation engine 140 to generate an execution plan 155 for the query. During compilation, the context of the statement is determined and stored with the execution plan. The context includes factors such as whether the query is issued by an external program or by the server, whether the query is recursive, and whether the statement is SQL or PLSQL, for example.

The query plan and the context information 155 are stored in memory 160, and are retrieved by an execution engine 180 each time the query is executed. The memory can be shared by multiple application programs, so that a query that is compiled once can be executed multiple times. The context information is used to determine which operations to perform at execution engine 180 in order to gather values for the statement's bind variables when the statement is executed. For example, if the context information indicates that the statement was issued by an external application program, then the execution engine will populate the bind buffer 186 with values for the bind variables retrieved from the wire 116. If the context information indicates that the statement was issued by the server, then the values for the bind variables can be retrieved from the server's memory and stored in bind buffer 188. In one embodiment, the context information is compiled by engine 140 into a set of actions to be taken by execution engine 180 in order to place bind values into a bind buffer. After the bind values are gathered, the execution engine 180 executes the query. During execution, values for variables are read from the bind buffer.

Figure 2:
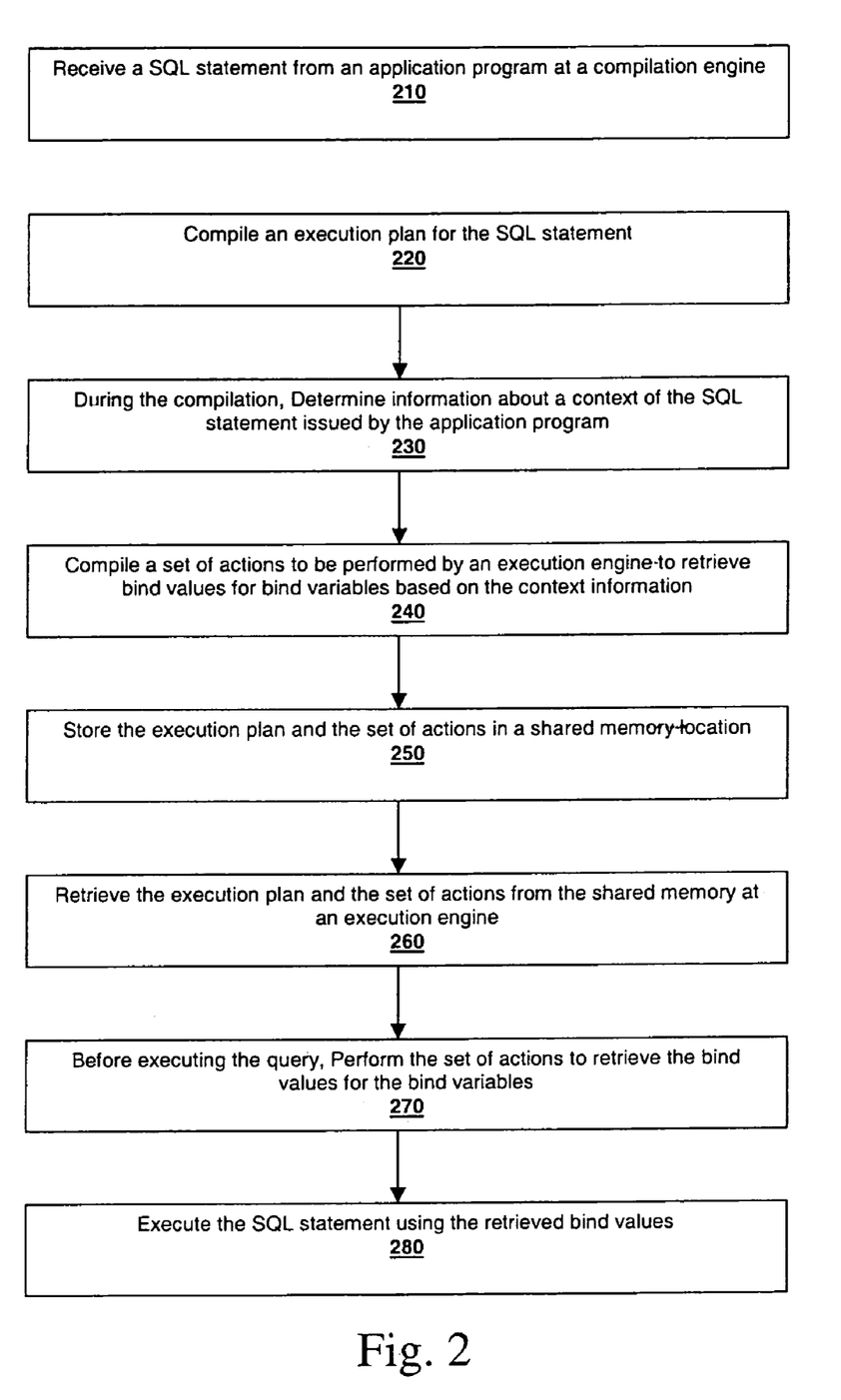
FIG. 2 shows an example of a method of generating and using context information to execute a statement.

FIG. 2 shows an example of a method of generating and using context information to execute a statement. An application program issues a statement, which is received by a compilation engine, 210. The engine compiles an execution plan, 220. The engine also determines information about the context of the statement, 230. The engine uses the context information to compile a set of actions that will retrieve specific values for variables in the statement, 240. The set of actions is stored along with the corresponding execution plan in a shared memory, 250. To execute the statement, an execution engine retrieves the execution plan, including the set of actions, from memory, 260. The execution engine performs the set of actions, which populates a buffer with values for variables in the statement, 270. Then, the statement is executed by the execution engine, 280, using the values in the buffer.

Therefore, by storing the context information with the query plan, the execution time for the query is improved, because this information does not have to be gathered during the execution time. Also, actions related to the context information can also be generated at compilation time, based on the context information, and provided to the execution engine. During execution, the engine reads the context information, which can be in the form of opcodes. The engine interprets the operations that are indicated by the opcodes, and performs the operations in order to populate the bind buffer with bind values for the statement's bind variables.

Elimination of Dispatch Overhead

An advantage of generating and storing compile time opcodes is reducing dispatch overhead (the time needed to determine where bind values are located) during execution time. The effective cost of the leaf actions (the time needed to retrieve the bind values from their locations) is much smaller compared to the dispatch overhead that appears in these components. One way to reduce or eliminate the dispatch overhead is to create a compiled set of actions that the runtime engine executes. In this manner, the runtime engine is spoon-fed the sequence of bind operations to perform in order to populate the bind buffer with bind values for the bind variables.

Containing Future Regressions

An advantage of this approach is that if the leaf operations are closely guarded, the performance of simple statements will not regress when new functionality is added.

This is because new functionality will use a new leaf operation which should not affect the performance sensitive code path. Hence, slow deterioration of code, which causes slowing the whole system (functionality bloat) can be contained.

Overall Contribution of Bind Code Path

The bind code path (In/Out) constitutes a large part of TPCC. As TPCC instructions are reduced to improve performance, the bind code path may constitute a much larger proportion of the overall code. Hence, optimizing this segment of the codepath increases the efficiency of the code.

Examples of Bind Operations which are Processed to Populate the Bind Buffer with Bind Values Each bind processing action accesses the bind buffer, to either copy or point the bind buffer into the user buffer in order to assign the associated bind variable to the corresponding bind value.

Most rpi binds should be no copy, meaning the bind processing includes a pointer assignment.

A TWO task (a statement issued from an external client) bind may be a copy bind, meaning that data is moved from the network buffer to the kernel bind buffer.

Context Information

A dispatch cost to determine which leaf operations (bind processes) to perform may be much more than the cost of performing the leaf operations themselves. Thus, context information reduces the dispatch cost of the various leaf operations through better compilation to a constant, which may be very small.

Leaf Operations Enumerated

Here is a list of examples of leaf operations that In/Out binds may be subject to (the parentheses contain a descriptive name of a suggested opcode)

1. EB—Bind (Dealing with a In bind opcode)
2. T—Twotask (Twotask cursor)
3. S—Scalar (Scalar bind)
   A—Array (Indexed table bind)
   X—Don't care (Can be scalar or array)
4. S—sql (Bind targeted into SQL statement)
   P—plsql (Bind targeted into PLSQL Begin . . . End Block)
   X—Don't care (can be sql or plsql)
5. I—In (In bind)
   N—Not out (Pure In bind)
   X—Don't care
6. O—Out (Out bind)
   N—Not in (Pure Out bind)
   X—Don't care
7. C—Copy (Copy)
   N—Nocopy
   X—Don't care
8. Extras:
   NE—no extra
   NS—no skip
   FN—function
   DP—duplicate
   SB—shift bind page
   LT—literal bind An opcode can be used to skip long values to be read later.

A pure In bind is an In bind which is definitely not an out bind, and a pure Out bind is an Out bind which is not an In bind.

An example of a format for out bind opcode is as follows:

1. OB—Out bind opcode
2. T—Twotask (external application)
   R—Rpi (internal application)
   X—Don't care (can be either twotask or rpi)
3. S—Scalar
   A—Array
   X—Don't care (can be scalar or array)
4. R—dml Returning
   P—Plsql
   X—Don't care
5. Extras:
   NE—no extra
   IR—Indicator and Return code
   PI—Put Indicator
   PR—Put Return code
   SB—Shift Bind
   RC—Ref Cursor
   ST STart transfer of data An extra opcode to start transfer needed only for non-recursive clients may be used.

Additional examples of leaf operations are:

Two task scalar sql In copy bind—The server reads an In bind from the wire into the kernel bind buffer. The bind buffer pointer is pointed at the user buffer.

Two task scalar plsql In copy bind—The server reads an In bind from the wire into the kernel bind buffer. For plsql, no change may be needed to the bind buffer pointer.

Recursive scalar In nocopy bind—The kernel points the kernel side bind buffer into the user bind buffer as it has been determined that no conversions may be required. This no-copy optimization may be applied for recursive sql. This may be the default case for any recursive binding when no copy is in effect.

Recursive scalar sql pure In nocopy bind—The kernel doesn't touch the bind buffer, but instead points the bind buffer into the location of the bind value as it has been determined that no conversions may be required. This no-copy optimization may be applied for recursive sql.

Recursive scalar sql pure In nocopy noskip bind—The kernel uses the same scalar copy repeatedly. This will happen when sql issued through plsql uses a scalar value in the binding for a multi row operation and specifies that the value does not need to be copied because it is not an Out bind.

Recursive scalar sql pure In nocopy function bind—In this case a bind buffer is populated lazily by a callback, and the user buffer is pointed at the lazily populated buffer. These are used for binding plsql collections.

Scalar In duplicate bind—The kernel points the duplicate bind buffer to the main bind buffer that already has the bind data. This may apply for all statements, whether top-level or recursive.

Twotask array plsql In bind—In this case, the current length of the array is read from the wire. Following this, each element of the array is two task scalar copied into the kernel bind buffer.

Scalar pure Out bind—The bind values are skipped for each iteration other than the first one.

Array plsql Out bind—The bind values are skipped for each iteration other than the first one.

Shift bind—Control instruction. This opcode takes in one operand, which is the bind position to shift to. This may be used when processing binds not in standard order or when bind buffers spill into different pages of the underlying segmented array.

Two task scalar pure In nocopy literal bind—In this case, the bind value is obtained from an internal buffer maintained by the literal replacement code.

Skip long bind—In this case, a long bind is encountered in sql. This is skipped and is read after the other bind values are read.

Unoptimized bind—No optimizations are performed, instead, the process goes through standard checks to determine context information and associated actions.

Start transfer of out binds—An indication is sent that a batch of columns is coming. This may be used for two-task clients, and may be sent at the beginning.

Two task scalar Plsql—The server sends a scalar value for a plsql bind variable. Indicators and return codes are also calculated, and are sent later, as needed.

Two task scalar plsql ref cursor—The server sends the describe information of the ref cursor along with the data (cursor number). The bind buffers described by plsql are also freed.

Recursive scalar plsql—The server writes the scalar value into the bind buffer for the plsql bind variable. Indicators and return codes are also calculated, and are sent later, as needed.

Two task array plsql—The server sends the array value for the plsql bind variable. Indicators and return codes may not be sent to the client.

Two task array Plsql with indicator—The server sends the array value along with the indicator and return codes for the plsql bind variable.

Recursive array Plsql—The server writes the array values for a plsql bind variable into the bind buffer for that bind along with the indicator and return code.

Two task put indicator—The indicator for a scalar plsql bind is sent back to the client.

Two task put return code—the return code for a scalar plsql bind is sent back to the client.

Shift bind—The bind position is changed to the bind position specified with the operand of shift bind. The bind buffer is also readjusted. This may happen if the bind crosses a page boundary or an Out bind occurs immediately after an In bind.

Two task scalar dml returning—The values for dml returning columns, along with the indicator and return codes, are sent back to the client.

Eof of page bind—The bytecodes themselves may be present in more than one page. This opcode marks the end of an existing page and the beginning of a new one.

Eof of file bind—All binds have been done.

Sharing Criteria Changes

As the system moves to an opcode based compilation and execution approach for processing bind values, the following enhancements may be performed to sharing criteria. Such changes provide separate opcodes to deal with different circumstances, and can include:

1. Top-level and recursive cursors (execution plans) are not shared.
2. Longs and non-long binds are not shared.
3. Scalar plsql binds are not shared by others.
4. Collections may not be shared with other types of binds.
5. The limiting value of longs is the same for two cursors to be shared.
6. Intra-call cursors and inter-call cursors are not shared (this can be applied to selects, because dmls complete in a single call). Additional optimizations may be performed so that plsql can specify whether the underlying sql complete in a single call so that nocopy bind buffers can be allocated.
7. Binds with buffers and without buffers are not shared.

System Architecture Overview

Figure 3:
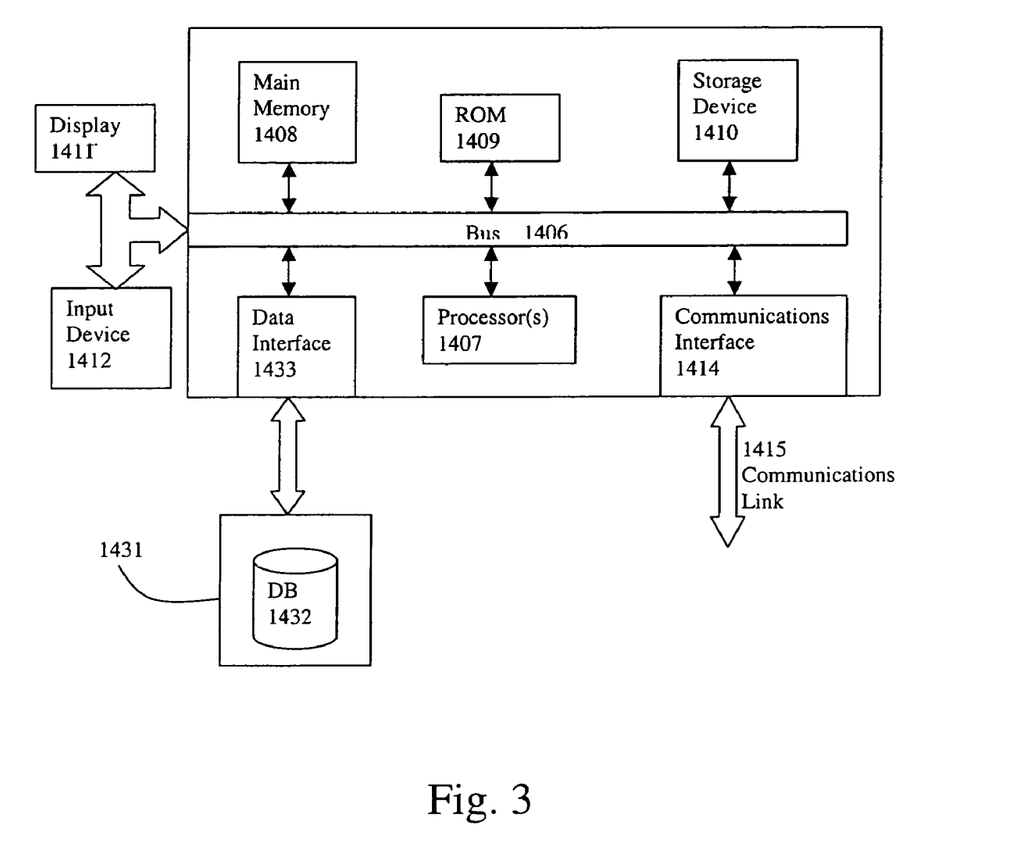
FIG. 3 illustrates an example system that can provide compile time opcodes for efficient runtime interpretation of variables for database queries and dml statements.

The execution of the sequences of instructions required to practice the invention may be performed in embodiments of the invention by a computer system 1400 as shown in FIG. 3. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 3, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a link to the internet through a telephone line, cable line, optical fiber, or an electromagnetic wave. The communication link may also be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer-implemented method of performing a query, comprising:
    compiling a query statement, by using a processor, to generate an execution plan with context information, wherein the execution plan with the context information will be retrieved during execution of the query statement, wherein during compilation of the query statement the context information is gathered and stored as an opcode, and the context information identifies a bind value for a bind variable of the query statement, wherein the bind variable is a placeholder in a query statement that must be replaced with a value before execution of the query statement;
    executing the query statement, wherein the act of executing the query statement comprises retrieving the execution plan with the context information and performing operations of the opcode associated with the context information such that the context information, gathered and stored as the opcode during the compilation of the query statement, is not gathered during the execution of the query statement; and
    storing the bind value in a volatile or non-volatile computer-usable medium or displaying the bind value on a display device.

2. The method of claim 1, further comprising:
    storing the execution plan and the opcode in a memory that can be shared by a plurality of application programs.

3. The method of claim 1, further comprising:
    storing the retrieved bind values in a bind buffer.

4. The method of claim 1, wherein the opcode identifies one or more operations to perform to retrieve the bind values.

5. The method of claim 1, wherein the opcode comprises information to identify a bind variable from the group consisting of: in bind information, out bind information, sql information, plsql information, copy information, no-copy information, recursive query information, scalar information, array information, external application information, internal application information, internal client information, or external client information.

6. A computer-implemented method comprising:
receiving a SQL statement having a plurality of bind variables at a compilation engine;
compiling, at the compilation engine by using a processor, an execution plan with context information for the SQL statement, wherein the context information is associated with the plurality of bind variables, the plurality of bind variables comprising a placeholder in the SQL statement that must be replaced with a value before execution of the SQL statement, wherein the execution plan with the context information will be retrieved during execution of the SQL statement;
determining an opcode for the context information during compilation of the SQL statement, wherein the opcode identifies at least one bind value for the plurality of bind variables, wherein the opcode indicates the operations to perform in order to populate a bind buffer with the at least one bind value for the plurality of bind variables of the SQL statement; and
storing the opcode in a volatile or non-volatile computer-usable medium or displaying the opcode on a display device.

7. The method of claim 6, further comprising:
storing the execution plan and the opcode for the SQL statement in a shared memory location that can be accessed by a plurality of applications.

8. The method of claim 7, further comprising:
sending the execution plan and the opcode to an execution engine.

9. The method of claim 8, further comprising:
executing a set of actions to gather bind values, wherein the set of actions are determined with the opcode; and
storing the bind values in the bind buffer.

10. The method of claim 9 further comprising:
executing the execution plan using the bind values in the bind buffer.

11. A computer program product embodied on a volatile or non-volatile computer readable medium, the computer readable medium having stored thereon a sequence of instructions which, when executed by a processor, causes the processor to execute a method for performing a query, the method comprising:
compiling a query statement to generate an execution plan with context information, wherein the execution plan with the context information will be retrieved during execution of the query statement, wherein during compilation of the query statement the context information is gathered and stored as an opcode, and the context information identifies a bind value for a bind variable of the query statement, wherein the bind variable is a placeholder in a query statement that must be replaced with a value before execution of the query statement;
executing the query statement, wherein the act of executing the query statement comprises retrieving the execution plan with the context information and performing operations of the opcode associated with the context information such that the context information, gathered and stored as the opcode during the compilation of the query statement, is not gathered during the execution of the query statement; and
storing the bind value or displaying the bind value on a display device.

12. The computer program product of claim 11, further comprising:
storing the execution plan and the opcode in a memory that can be shared by a plurality of application programs.

13. The computer program product of claim 11, further comprising:
storing the retrieved bind values in a bind buffer.

14. The computer program product of claim 11, wherein the opcode identifies one or more operations to perform to retrieve the bind values.

15. The computer program product of claim 11, wherein the opcode comprises information to identify a bind variable from the group consisting of: in bind information, out bind information, sql information, plsql information, copy information, no-copy information, recursive query information, scalar information, array information, external application information, internal application information, internal client information, or external client information.

16. A computer program product embodied on a volatile or non-volatile computer readable medium, the computer readable medium having stored thereon a sequence of instructions which, when executed by a processor, causes the processor to execute a method, the method comprising:
receiving a SQL statement having a plurality of bind variables at a compilation engine;
compiling at the compilation engine an execution plan with context information for the SQL statement, wherein the context information is associated with the plurality of bind variables, the plurality of bind variables comprising a placeholder in the SQL statement that must be replaced with a value before execution of the SQL statement, wherein the execution plan with the context information will be retrieved during execution of the SQL statement; and
determining an opcode for the context information during compilation of the SQL statement, wherein the opcode identifies at least one bind value for the plurality of bind variables, wherein the opcode indicates the operations to perform in order to populate a bind buffer with the at least one bind value for the plurality of bind variables of the SQL statement; and
storing the opcode in or displaying the opcode on a display device.

17. The computer program product of claim 16, further comprising:
storing the execution plan and the opcode for the SQL statement in a shared memory location.

18. The computer program product of claim 17, further comprising:
sending the execution plan and the opcode to an execution engine.

19. The computer program product of claim 18, further comprising:
executing a set of actions to gather bind values, wherein the set of actions are determined with the opcode; and
storing the bind values in the bind buffer.

20. The computer program product of claim 19 further comprising:
executing the execution plan using the bind values in the bind buffer.

21. A system for performing a query, the system comprising:
a processor programmed for:
compiling a query statement to generate an execution plan with context information, wherein the execution plan with the context information will be retrieved during execution of the query statement, wherein during compilation of the query statement, the context information is gathered and stored as an opcode, and the context information identifies a bind value for a bind variable of the query statement, wherein the bind variable is a placeholder in a query statement that must be replaced with a value before execution of the query statement;
executing the query statement, wherein the act of executing the query statement comprises retrieving the execution plan with the context information and performing operations of the opcode associated with the context information such that the context information, gathered and stored as the opcode during the compilation of the query statement, is not gathered during the execution of the query statement; and
a volatile or non-volatile computer-usable medium for storing the bind value or a display device for displaying the bind value.

22. The system of claim 21, further comprising:
a memory for storing the compiled execution plan and the opcode, wherein the memory is shared by a plurality of application programs.

23. The system of claim 21, further comprising:
a bind buffer for storing the retrieved bind values.

24. The system of claim 21, wherein the opcode identifies one or more operations to perform to retrieve the bind values.

25. The system of claim 21, wherein the opcode comprises information to identify a bind variable from the group consisting of: in bind information, out bind information, sql information, plsql information, copy information, no-copy information, recursive query information, scalar information, array information, external application information, internal application information, internal client information, or external client information.

26. A system for performing a query, comprising:
a processor programmed for:
receiving a SQL statement having a plurality of bind variables at a compilation engine;
compiling at the compilation engine an execution plan with context information for the SQL statement, wherein the context information is associated with the plurality of bind variables, the plurality of bind variables comprising a placeholder in the SQL statement that must be replaced with a value before execution of the SQL statement, wherein the execution plan with the context information will be retrieved during execution of the SQL statement;
determining an opcode for the context information during compilation of the SQL statement, wherein the opcode identifies at least one bind value for the plurality of bind variables, wherein the opcode indicates the operations to perform in order to populate a bind buffer with the at least one bind value for the plurality of bind variables of the SQL statement; and
a volatile or non-volatile computer-usable medium for storing the opcode or a display device for displaying the opcode.

27. The system of claim 26, further comprising:
a shared memory location for storing the execution plan and the set of bind actions for the SQL statement.

28. The system of claim 27, wherein the processor is further programmed:
for sending the execution plan and the set of actions to an execution engine.

29. The system of claim 28, wherein the processor is further programmed for:
executing a set of actions to gather bind values, wherein the opcode determines the set of actions; and
storing the bind values in the bind buffer.

30. The system of claim 29, wherein the processor is further programmed for executing the execution plan using the bind values in the bind buffer.

* * * * *

UNITED STATES PATENT AND TRADEMARK OFFICE
CERTIFICATE OF CORRECTION

| | | |
|---|---|---|
| PATENT NO. | : 7,912,835 B2 | Page 1 of 1 |
| APPLICATION NO. | : 11/104993 | |
| DATED | : March 22, 2011 | |
| INVENTOR(S) | : Rajamani et al. | |

It is certified that error appears in the above-identified patent and that said Letters Patent is hereby corrected as shown below:

In column 2, line 35, delete "faster:" and insert -- faster. --, therefor.

In column 4, line 18, delete "EB" and insert -- IB --, therefor.

In column 8, line 43-44, in Claim 1, delete "statement" and insert -- statement, --, therefor.

In column 9, line 57, in Claim 11, delete "statement" and insert -- statement, --, therefor.

In column 12, line 28, in Claim 28, delete "programmed:" and insert -- programmed --, therefor.

Signed and Sealed this
Fourth Day of October, 2011

David J. Kappos
*Director of the United States Patent and Trademark Office*